US011450102B2

(12) United States Patent
Huo et al.

(10) Patent No.: US 11,450,102 B2
(45) Date of Patent: Sep. 20, 2022

(54) SYSTEM AND METHOD FOR SPATIALLY MAPPING SMART OBJECTS WITHIN AUGMENTED REALITY SCENES

(71) Applicant: Purdue Research Foundation, West Lafayette, IN (US)

(72) Inventors: Ke Huo, West Lafayette, IN (US); Karthik Ramani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 86 days.

(21) Appl. No.: 16/977,616

(22) PCT Filed: Feb. 27, 2019

(86) PCT No.: PCT/US2019/019705
§ 371 (c)(1),
(2) Date: Sep. 2, 2020

(87) PCT Pub. No.: WO2019/168886
PCT Pub. Date: Sep. 6, 2019

(65) Prior Publication Data
US 2021/0365681 A1 Nov. 25, 2021

Related U.S. Application Data

(60) Provisional application No. 62/637,784, filed on Mar. 2, 2019.

(51) Int. Cl.
*G06V 20/20* (2022.01)
*G06F 3/0484* (2022.01)
(Continued)

(52) U.S. Cl.
CPC .......... *G06V 20/20* (2022.01); *G06F 3/0484* (2013.01); *G06T 11/00* (2013.01); *G06T 15/00* (2013.01);
(Continued)

(58) Field of Classification Search
CPC ....... G06F 3/0484; G06T 11/00; G06T 15/00; G06T 2200/24; H04W 88/02
See application file for complete search history.

(56) References Cited

U.S. PATENT DOCUMENTS 7,456,596 B2   11/2008   Goodall
7,962,150 B2    6/2011   Hertzog
(Continued)

FOREIGN PATENT DOCUMENTS

WO   2015183014 A1   12/2015

OTHER PUBLICATIONS

International Search Report and Written Opinion of PCT/US2019/019705, dated May 3, 2019.
(Continued)

*Primary Examiner* — Grace Q Li
(74) *Attorney, Agent, or Firm* — Maginot, Moore & Beck LLP

(57) ABSTRACT

A method and system for localizing a plurality of stationary devices, such as Internet of Things (IoT devices), arranged in an environment is disclosed. A mobile device is configured to survey an environment to generate a three-dimensional map of the environment using simultaneous localization and mapping (SLAM) techniques. The mobile device and the stationary devices are equipped with wireless transceivers, such as Ultra-wideband radios, for measuring distances between the devices using wireless ranging techniques. Based on the measured distances, the mobile device is configured to determine locations of the stationary devices
(Continued)

in a reference frame of the three-dimensional map. In some embodiments, the determined locations can be used to enable a variety of spatially aware augmented reality features and interactions between the mobile device and the stationary device.

20 Claims, 8 Drawing Sheets

(51) Int. Cl.
    *G06T 11/00*     (2006.01)
    *G06T 15/00*     (2011.01)
    *H04W 88/02*     (2009.01)
(52) U.S. Cl.
    CPC ......... *G06T 2200/24* (2013.01); *H04W 88/02* (2013.01)

(56) References Cited

U.S. PATENT DOCUMENTS

| | | | |
|---|---|---|---|
| 8,577,392 | B1 | 11/2013 | Pai |
| 9,110,159 | B2 | 8/2015 | Vartanian |
| 9,294,539 | B2 | 3/2016 | Hinckley |
| 9,712,948 | B2 * | 7/2017 | Blanche ............... H04W 8/005 |
| 9,945,929 | B2 | 4/2018 | Hehn et al. |
| 10,140,769 | B2 | 11/2018 | Kim et al. |
| 2013/0307723 | A1 * | 11/2013 | Garin ...................... G01S 5/14 342/357.29 |
| 2014/0315570 | A1 * | 10/2014 | Yun ........................ G01C 21/20 455/456.1 |
| 2014/0323148 | A1 | 10/2014 | Schmalstieg et al. |
| 2014/0342667 | A1 * | 11/2014 | Aarnio ..................... H04W 4/80 455/41.2 |
| 2015/0310664 | A1 | 10/2015 | Boussard et al. |
| 2016/0011673 | A1 * | 1/2016 | Moshfeghi ............ A63F 13/235 345/156 |
| 2016/0173293 | A1 | 6/2016 | Kennedy |
| 2016/0203522 | A1 * | 7/2016 | Shiffert ................. H04L 67/104 705/14.58 |
| 2016/0285979 | A1 | 9/2016 | Wang et al. |
| 2017/0061490 | A1 * | 3/2017 | Ghahremani ......... H04W 4/023 |
| 2017/0352192 | A1 | 12/2017 | Petrovskaya et al. |
| 2019/0027021 | A1 * | 1/2019 | Ko ......................... H04M 1/725 |
| 2019/0094027 | A1 * | 3/2019 | Xu ........................ G05D 1/0246 |

OTHER PUBLICATIONS

Abdulrahman Alarifi, AbdulMalik Al-Salman, Mansour Alsaleh, Ahmad Alnafessah, Suheer Al-Hadhrami, Mai A Al-Ammar, and Hend S Al-Khalifa. 2016. Ultra wideband indoor positioning technologies: Analysis and recent advances. Sensors 16, 5 (2016), 707.
Isaac Amundson and Xenofon Koutsoukos. 2009. A survey on localization for mobile wireless sensor networks. Mobile entity localization and tracking in GPS-less environnments (2009), 235-254.
Ferran Argelaguet and Carlos Andujar. 2009. Visual feedback techniques for virtual pointing on stereoscopic displays. In Proceedings of the 16th ACM Symposium on Virtual Reality Software and Technology. ACM, 163-170.
ASUS. 2017. ZenFone-AR. (2017). Retrieved Sep. 1, 2017 from https://www.asus.com/us/Phone/ZenFone-AR-ZS571KL/.
Shuanghua Bai and Houduo Qi. 2016. Tackling the flip ambiguity in wireless sensor network localization and beyond. Digital Signal Processing 55 (2016), 85-97.
Till Ballendat, Nicolai Marquardt, and Saul Greenberg. 2010. Proxemic interaction: designing for a proximity and orientation-aware environment. In ACM International Conference on Interactive Tabletops and Surfaces. ACM, 121-130.
Ingwer Borg and Patrick JF Groenen. 2005. Modern multidimensional scaling: Theory and applications. Springer Science & Business Media.
Sebastian Boring, Dominikus Baur, Andreas Butz, Sean Gustafson, and Patrick Baudisch. 2010. Touch projector: mobile interaction through video. In Proceedings of the SIGCHI Conference on Human Factors in Computing Systems. ACM, 2287-2296.
Barry Brumitt, John Krumm, Brian Meyers, and Steven Shafer. 2000. Ubiquitous computing and the role of geometry. IEEE Personal Communications 7, 5 (2000), 41-43.
Yu-Hsiang Chen, Ben Zhang, Claire Tuna, Yang Li, Edward A Lee, and Bjorn Hartmann. 2013. A context menu for the real world: Controlling physical appliances through head-worn infrared targeting. Technical Report. California Univ Berkeley Dept of Electrical Engineering and Computer Sciences.
Jose A Costa, Neal Patwari, and Alfred O Hero III. 2006. Distributed weighted-multidimensional scaling for node localization in sensor networks. ACM Transactions on Sensor Networks (TOSN) 2, 1 (2006), 39-64.
Adrian A de Freitas, Michael Nebeling, Xiang'Anthony' Chen, Junrui Yang, Akshaye Shreenithi Kirupa Karthikeyan Ranithangam, and Anind K Dey. 2016. Snap-to-it: A user-inspired platform for opportunistic device interactions. In Proceedings of the 2016 CHI Conference on Human Factors in Computing Systems. ACM, 5909-5920.
Jan De Leeuw and Patrick Mair. 2011. Multidimensional scaling using majorization: SMACOF in R. Department of Statistics, UCLA (2011).
Carmelo Di Franco, Enrico Bini, Mauro Marinoni, and Giorgio C Buttazzo. 2017a. Multidimensional scaling localization with anchors. In Autonomous Robot Systems and Competitions (ICARSC), 2017 IEEE International Conference on. IEEE, 49-54.
Carmelo Di Franco, Amanda Prorok, Nikolay Atanasov, Benjamin P Kempke, Prabal Dutta, Vijay Kumar, and George J Pappas. 2017b. Calibration-free network localization using non-line-of-sight ultra-wideband measurements . . . In IPSN. 235-246.
Ivan Dokmanic, Reza Parhizkar, Juri Ranieri, and Martin Vetterli. 2015. Euclidean distance matrices: Essential theory, algorithms, and applications. IEEE Signal Processing Magazine 32, 6 (2015), 12-30.
Hans Gellersen, Carl Fischer, Dominique Guinard, Roswitha Gostner, Gerd Kortuem, Christian Kray, Enrico Rukzio, and Sara Streng. 2009. Supporting device discovery and spontaneous interaction with spatial references. Personal and Ubiquitous Computing 13, 4 (2009), 255-264.
Google. 2017. ARCore. (2017). Retrieved Sep. 1, 2017 from https://developers.google.com/ar/.
Uwe Gruenefeld, Abdallah El Ali, Wilko Heuten, and Susanne Boll. 2017. Visualizing out-of-view objects in head-mounted augmented reality. In Proceedings of the 19th International Conference on Human-Computer Interaction with Mobile Devices and Services. ACM, 81.
Anhong Guo, Jeeeun Kim, Xiang'Anthony' Chen, Tom Yeh, Scott E Hudson, Jennifer Mankoff, and Jeffrey P Bigham. 2017. Facade: Auto-generating tactile interfaces to appliances. In Proceedings of the 2017 CHI Conference on Human Factors in Computing Systems. ACM, 5826-5838.
Dirk Hahnel, Wolfram Burgard, Dieter Fox, Ken Fishkin, and Matthai Philipose. 2004. Mapping and localization with RFID technology. In Robotics and Automation, 2004. Proceedings. ICRA'04. 2004 IEEE International Conference on, vol. 1. IEEE, 1015-1020.
Valentin Heun, James Hobin, and Pattie Maes. 2013. Reality editor: programming smarter objects. In Proceedings of the 2013 ACM conference on Pervasive and ubiquitous computing adjunct publication. ACM, 307-310.
Yi Jiang and Victor CM Leung. 2007. An asymmetric double sided two-way ranging for crystal offset. In Signals, Systems and Electronics, 2007. ISSSE'07. International Symposium on. IEEE, 525-528.
Gierad Laput, Chouchang Yang, Robert Xiao, Alanson Sample, and Chris Harrison. 2015. Em-sense: Touch recognition of uninstrumented, electrical and electromechanical objects. In Proceedings of the 28th Annual ACM Symposium on User Interface Software & Technology. ACM, 157-166.

(56) References Cited

OTHER PUBLICATIONS

David Ledo, Saul Greenberg, Nicolai Marquardt, and Sebastian Boring. 2015. Proxemic-aware controls: Designing remote controls for ubiquitous computing ecologies. In Proceedings of the 17th International Conference on Human-Computer Interaction with Mobile Devices and Services. ACM, 187-198.

Sikun Lin, Hao Fei Cheng, Weikai Li, Zhanpeng Huang, Pan Hui, and Christoph Peylo. 2017a. Ubii: Physical World Interaction Through Augmented Reality. IEEE Transactions on Mobile Computing 16, 3 (2017), 872-885.

Yung-Ta Lin, Yi-Chi Liao, Shan-Yuan Teng, Yi-Ju Chung, Liwei Chan, and Bing-Yu Chen. 2017b. Outside-In: Visualizing Out-of-Sight Regions-of-Interest in a 360 Video Using Spatial Picture-in-Picture Previews. In Proceedings of the 30th Annual Symposium on User Interface Software and Technology. ACM.

Nicolai Marquardt, Robert Diaz-Marino, Sebastian Boring, and Saul Greenberg. 2011. The proximity toolkit: prototyping proxemic interactions in ubiquitous computing ecologies. In Proceedings of the 24th annual ACM symposium on User interface software and technology. ACM, 315-326.

Simon Mayer, Markus Schalch, Marian George, and G'abor Soros. 2013. Device recognition for intuitive interaction with the web of things. In Proceedings of the 2013 ACM conference on Pervasive and ubiquitous computing adjunct publication. ACM, 239-242.

Microsoft. 2017. Hololens. (2017). Retrieved Sep. 1, 2017 from https://www.microsoft.com/en-us/hololens.

Charith Perera, Arkady Zaslavsky, Peter Christen, and Dimitrios Georgakopoulos. 2014. Context aware computing for the internet of things: A survey. IEEE Communications Surveys & Tutorials 16, 1 (2014), 414-454.

Sudeep Pillai and John Leonard. 2015. Monocular slam supported object recognition. arXiv preprint arXiv:1506.01732 (2015).

Math.Net Project. 2017. Math.Net Numerics. (2017). Retrieved Sep. 1, 2017 from https://numerics.mathdotnet.com/.

Jun Rekimoto, Yuji Ayatsuka, Michimune Kohno, and Haruo Oba. 2003. Proximal Interactions: A Direct Manipulation Technique for Wireless Networking . . . In Interact, vol. 3. 511-518.

Enrico Rukzio, Karin Leichtenstern, Vic Callaghan, Paul Holleis, Albrecht Schmidt, and Jeannette Chin. 2006. An experimental comparison of physical mobile interaction techniques: Touching, pointing and scanning. UbiComp 2006: Ubiquitous Computing (2006), 87-104.

Renato F Salas-Moreno, Richard A Newcombe, Hauke Strasdat, Paul HJ Kelly, and Andrew J Davison. 2013. Slam++: Simultaneous localisation and mapping at the level of objects. In Proceedings of the IEEE conference on computer vision and pattern recognition. 1352-1359.

Dominik Schmidt, David Molyneaux, and Xiang Cao. 2012. PICOntrol: using a handheld projector for direct control of physical devices through visible light. In Proceedings of the 25th annual ACM symposium on User interface software and technology. ACM, 379-388.

Eldon Schoop, Michelle Nguyen, Daniel Lim, Valkyrie Savage, Sean Follmer, and Bjorn Hartmann. 2016. Drill Sergeant: Supporting physical construction projects through an ecosystem of augmented tools. In Proceedings of the 2016 CHI Conference Extended Abstracts on Human Factors in Computing Systems. ACM, 1607-1614.

Bruce Sterling. 2013. Augmented Reality: new patent allows Google Glass to control appliances. (2013).

Unity3D. 2017. Unity3D. (2017). Retrieved Sep. 1, 2017 from https://unity3d.com/.

Pasi Valkkynen and Timo Tuomisto. 2005. Physical Browsing Research. PERMID 2005 (2005), 35-38.

Edward J Wang, Tien-Jui Lee, Alex Mariakakis, Mayank Goel, Sidhant Gupta, and Shwetak N Patel. 2015. Magnifisense: Inferring device interaction using wrist-worn passive magneto-inductive sensors. In Proceedings of the 2015 ACM International Joint Conference on Pervasive and Ubiquitous Computing. ACM, 15-26.

Roy Want, Kenneth P Fishkin, Anuj Gujar, and Beverly L Harrison. 1999. Bridging physical and virtual worlds with electronic tags. In Proceedings of the SIGCHI conference on Human Factors in Computing Systems. ACM, 370-377.

Wikitude. 2017. Wikitude Documentation. (2017). Retrieved Sep. 1, 2017 from https://www.wikitude.com/documentation/.

Robert Xiao, Gierad Laput, Yang Zhang, and Chris Harrison. 2017. Deus EM Machina: On-Touch Contextual Functionality for Smart IoT Appliances. In Proceedings of the 2017 CHI Conference on Human Factors in Computing Systems. ACM, 4000-4008.

Sang Ho Yoon, Yunbo Zhang, Ke Huo, and Karthik Ramani. 2016. TRing: Instant and Customizable Interactions with Objects Using an Embedded Magnet and a Finger-Worn Device. In Proceedings of the 29th Annual Symposium on User Interface Software and Technology. ACM, 169-181.

Gang Pan, Jiahui Wu, Daqing Zhang, Zhaohui Wu, Yingchun Yang, and Shijian Li. 2010. GeeAir: a universal multimodal remote control device for home appliances. Personal and Ubiquitous Computing 14, 8 (2010), 723-735.

Kun Qian, Chenshu Wu, Zimu Zhou, Yue Zheng, Zheng Yang, and Yunhao Liu. 2017. Inferring motion direction using commodity wi-fi for interactive exergames. In Proceedings of the 2017 CHI Conference on Human Factors in Computing Systems. ACM, 1961-1972.

Spencer Russell, Gershon Dublon, and Joseph A Paradiso. 2016. Hearthere: Networked sensory prosthetics through auditory augmented reality. In Proceedings of the 7th Augmented Human International Conference 2016. ACM, 20.

S Venkatesh and RM Buehrer. 2007. Non-line-of-sight identification in ultra-wideband systems based on received signal statistics. IET Microwaves, Antennas & Propagation 1, 6 (2007), 1120-1130.

\* cited by examiner

SYSTEM AND METHOD FOR SPATIALLY MAPPING SMART OBJECTS WITHIN AUGMENTED REALITY SCENES

This application claims the benefit of priority of U.S. provisional application Ser. No. 62/637,784, filed on Mar. 2, 2018 the disclosure of which is herein incorporated by reference in its entirety.

GOVERNMENT LICENSE RIGHTS

This invention was made with government support under funding number IIP1632154 awarded by the National Science Foundation. The government has certain rights in the invention.

FIELD

The device and method disclosed in this document relates to augmented reality and, more particularly, to spatially mapping smart objects within augmented reality scenes.

BACKGROUND

Unless otherwise indicated herein, the materials described in this section are not prior art to the claims in this application and are not admitted to the prior art by inclusion in this section.

The ecology of connected smart devices is being rapidly interwoven with people's daily lives and work environments. People envision that their surrounding physical world will largely be enhanced with ubiquitous computing. However, accessing and interacting with the Internet of Things (IoT) remains challenging due to the increasing diversity and complexity of the connected devices. Traditionally, the digital interfaces of the interactive devices have been realized with a self-equipped touch screen display which has a limited adaptability. But now, contemporary IoT devices allow users to access full functionalities remotely by using an offloaded interface on a smartphone. Still, in order to discover and access the devices, users need to browse through a specific webpage on-line or search for the corresponding applications for each device.

Augmented reality (AR) applications and devices allow for new and intuitive interactions with the environment and with others. Mobile AR devices using state-of-the-art simultaneous localization and mapping (SLAM) techniques can provide highly accurate self-localization with respect to a surrounding environment without external tracking setups and prior maps. The self-localization of the mobile AR device can enable spatially aware interactions interaction with the environment. However, even with SLAM, conventional AR applications and devices only provide a geometric map of the surrounding environment, with limited or no additional information about the objects or devices, such as IoT devices, which make up the surrounding environment.

Accordingly, it would be advantageous to provide a mobile AR device with an intuitive and unified AR interface for discovering, monitoring, and operating a diverse array of IoT devices in a surrounding environment.

SUMMARY

A method for localizing a plurality of stationary devices in an environment with a mobile device is disclosed. The method comprises: capturing a first plurality of images of the environment with a camera of the mobile device, the first plurality of images being captured as the mobile device is moved throughout the environment; generating, with a processor of the mobile device, a three-dimensional map of the environment based on the first plurality of images of the environment; measuring a first plurality of distance measurements between the mobile device and each individual stationary device in the plurality of stationary devices, the first plurality of distance measurements being measured by operating a first wireless transceiver of the mobile device to exchange messages with respective second wireless transceivers of each of the plurality of stationary devices; receiving, from the plurality of stationary devices, a second plurality of distance measurements between each stationary device in the plurality of stationary devices and each other stationary device in the plurality of stationary devices, the second plurality of distance measurements being measured by operating the second wireless transceiver of each stationary device in the plurality of stationary devices to exchange messages with the second wireless transceivers of each other stationary device in the plurality of stationary devices; and determining, with the processor, locations of the plurality of stationary devices in a reference frame of the three-dimensional map of the environment based on the first plurality of distance measurements and the second plurality of distance measurements.

A mobile device for localizing a plurality of stationary devices in an environment is disclosed. The mobile device comprises: a camera configured to capture images of the environment; a first wireless transceiver configured to measure distances between the mobile device and individual stationary devices in the plurality of stationary devices by exchanging messages with respective second wireless transceivers of each of the plurality of stationary devices; and a processor operably connected to the camera and to the first wireless transceiver. The processor is configured to: operate the camera to capture a first plurality of images of the environment, the first plurality of images being captured as the mobile device is moved throughout the environment; generate a three-dimensional map of the environment based on the first plurality of images of the environment; operate the first transceiver to measure a first plurality of distance measurements between the mobile device and each individual stationary device in the plurality of stationary devices; receive, from the plurality of stationary devices, a second plurality of distance measurements between each stationary device in the plurality of stationary devices and each other stationary device in the plurality of stationary devices, the second plurality of distance measurements being measured by operating the second wireless transceiver of each stationary device in the plurality of stationary devices to exchange messages with the second wireless transceivers of each other stationary device in the plurality of stationary devices; and determine locations of the plurality of stationary devices in a reference frame of the three-dimensional map of the environment based on the first plurality of distance measurements and the second plurality of distance measurements.

BRIEF DESCRIPTION OF THE DRAWINGS

The foregoing aspects and other features of the method and device are explained in the following description, taken in connection with the accompanying drawings.

DETAILED DESCRIPTION

Figure 1:
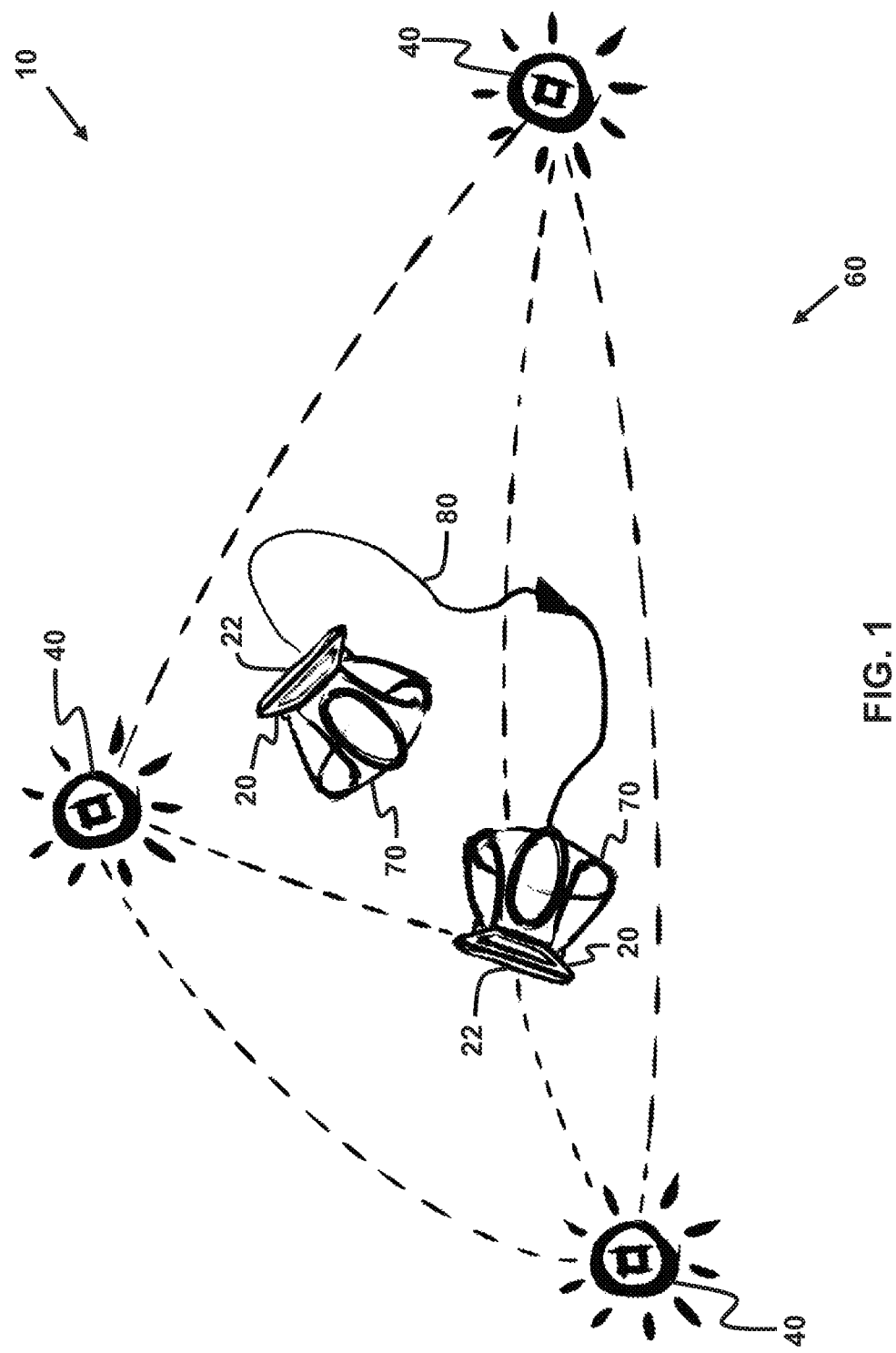
FIG. 1 shows an exemplary embodiment of an augmented reality system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

Figure 2:
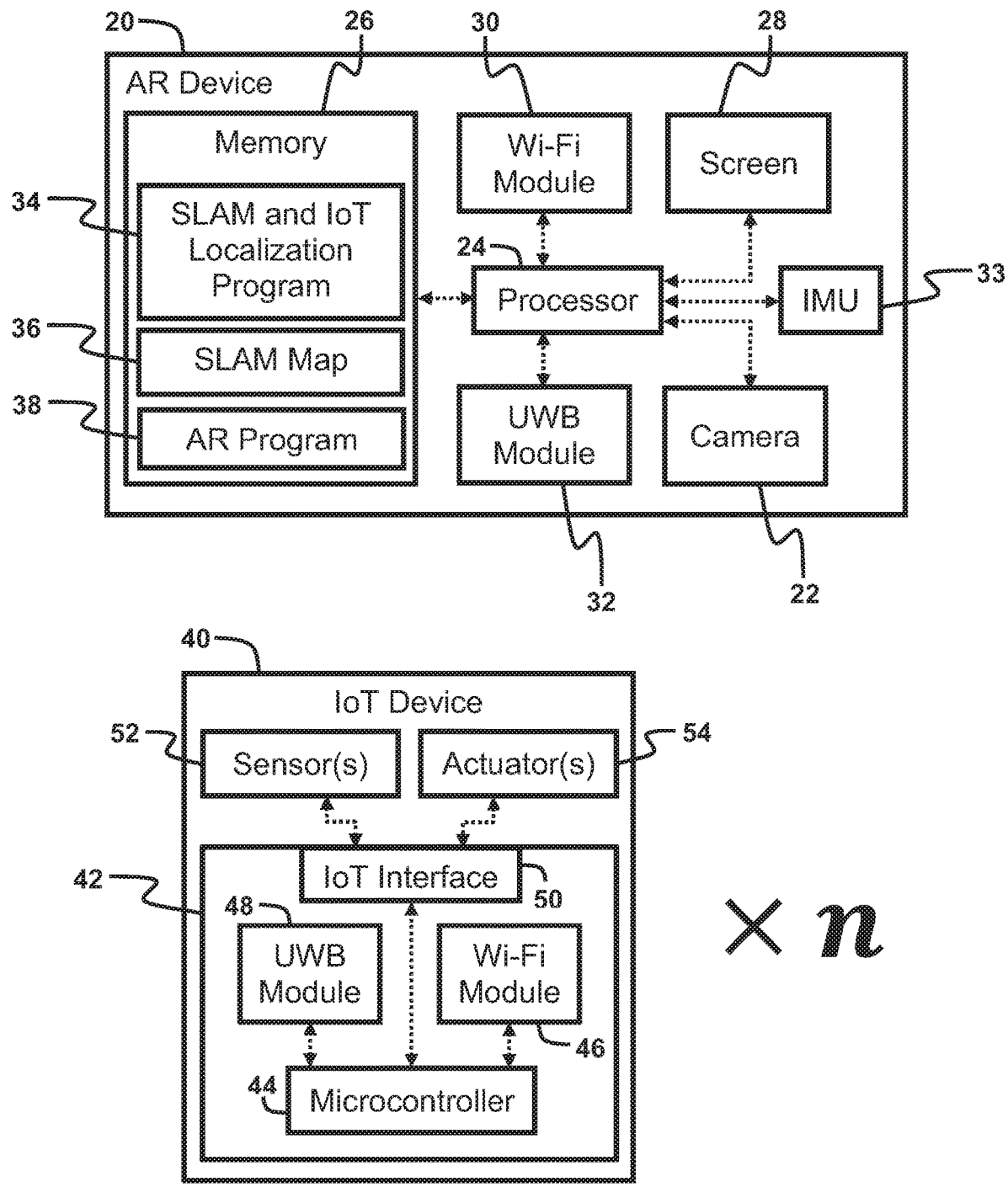
FIG. 2 shows exemplary components of the augmented reality device and Internet of Things (IoT) devices of FIG. 1.

With reference to FIGS. 1-2, exemplary embodiments of an augmented reality system 10 are shown. To alleviate the cumbersome conventional processes of discovering, monitoring, and operating IoT devices, the augmented reality system 10 leverages augmented reality and spatial information regarding IoT devices in an environment to provide an intuitive and unified interface for discovering, monitoring, and operating a diverse array of IoT devices. The augmented reality system 10 enables a variety of novel features and interactions by superimposing graphical digital interfaces onto the physical world which allow a user to directly and intuitively access the smart devices in his or her environment.

As shown in FIG. 1, the augmented reality system 10 at least includes an augmented reality device 20 (which may also be referred to herein as the "dynamic node") and one or more Internet of Things (IoT) devices 40 (which may also be referred to herein as the "stationary nodes"). The augmented reality device 20 may comprise any mobile computing device, such as, but not limited to, a smartphone, a tablet computer, a handheld camera, a head mounted display, or the like. The IoT devices 40 are arranged within a scene 60. The scene 60 comprises a real-world environment, such as a room, and may contain a variety of objects or structures therein, in addition to the IoT devices 40. The IoT devices 40 may comprise a variety of different machines, controllers, actuators, sensors, computers, or any other device configured with network connectivity. Some exemplary IoT devices 40 include, but are not limited to, light bulbs, lights switches, a programmable thermostat, a fan, a humidifier, a television, a printer, a watering can, speakers, environmental sensors, and/or a network router.

The augmented reality device 20 comprises camera 22. The camera 22 is configured to capture a plurality of images of a scene 60 as the augmented reality device 20 is moved around the scene 60, by a user 70 or by some other means.

The camera 22 is configured to generate image frames of the scene 60, each of which comprises a two-dimensional array of pixels. Each pixel has corresponding photometric information (intensity, color, and/or brightness). In some embodiments, the camera 22 is configured to generate RGB-D images in which each pixel has corresponding photometric information and geometric information (depth and/or distance). In such embodiments, the camera 22 may, for example, take the form of two RGB cameras configured to capture stereoscopic images from which depth and/or distance information can be derived, and/or an RGB camera with an associated IR camera configured to provide depth and/or distance information.

As the augmented reality device 20 is moved along a surveying path 80, the camera 22 captures a plurality of images of a scene 60, which are used to by a simultaneous localization and mapping (SLAM) procedure to generate a three-dimensional map of the scene 60. It will be appreciated that, at a given camera position and orientation (camera pose), the camera 22 has a restricted field of view such that an image captured by the camera 22 at the given camera pose only includes a small portion of the scene 60. However, by moving the augmented reality device 20 along the surveying path 80 with sufficiently diverse camera poses, information regarding a larger portion of the scene 60 can be captured for the purpose of generating the three-dimensional map of the scene 60 and enabling various augmented reality features. It will be appreciated however, that the entirety of the scene 60 needn't be surveyed and mapped by the augmented reality device 20. The IoT devices 40 can be localized even if they reside in a portion of the scene 60 that has not been surveyed or mapped. Additionally, it will be appreciated that the surveying paths used to map the scene 60 are not necessarily the same surveying paths used in the localization method discussed in greater detail below. Moreover, it should be appreciated that the surveying paths shown in FIG. 1 are not drawn to scale with respect to the IoT devices 40 and that the surveying paths can be on a very small scale, while the IoT devices 40 may be arranged on a larger scale.

As discussed in further detail below, the augmented reality device 20 is advantageously configured to measure and/or receive a plurality of distance measurements 90 from the IoT devices 40. The plurality of distance measurements 90 include distance measurements from each IoT device 40 to the augmented reality device 20, as well as distance measurements from each IoT device 40 to each other IoT device 40. Based on the plurality of distance measurements 90, the augmented reality device 20 utilizes a distance based localization algorithm to determine a respective location of each of the IoT devices 40 within the three-dimensional map of the scene 60 generated by the augmented reality device 20. By mapping locations of the IoT devices 40 into the coordinate system of the three-dimensional map of the scene 60, the augmented reality system 10 enables spatial context aware interactions, including distant pointing, proximity based control, and visual navigation.

FIG. 2 shows exemplary components of the augmented reality device 20 and the IoT devices 40 of the augmented reality system 10. It will be appreciated that the components of the augmented reality device 20 and the IoT devices 40 shown and described are merely exemplary and that the augmented reality device 20 and the IoT devices 40 may comprise any alternative configuration. Moreover, in the illustration of FIG. 2, only a single augmented reality device 20 and a single IoT device 40 are shown. However, in practice the augmented reality system 10 may include one or a plurality of n IoT devices 40.

In the illustrated exemplary embodiment, in addition to the camera 22 discussed above, the augmented reality device 20 comprises a processor 24 and a memory 26. The memory 26 is configured to store data and program instructions that, when executed by the processor 24, enable the augmented reality device 20 to perform various operations described herein. The memory 26 may be of any type of device capable of storing information accessible by the processor 24, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 24 may include a system with a central processing unit, graphics processing units, multiple processing units, dedicated circuitry for achieving functionality, programmable logic, or other processing systems. The processor 24 is configured to communicate with other components of the augmented reality device 20 via one or more connections, data busses, or the like (e.g., using SPI and/or UART).

The augmented reality device 20 further comprises a display screen 28. The display screen 28 may comprise any of various known types of displays, such as LCD or OLED screens. In some embodiments, the display screen 28 may comprise a touch screen configured to receive touch inputs from a user. In the case of a head-mounted display, the augmented reality device 20 may comprise a transparent screen, through which a user can view the outside world, configured to superimpose certain graphical elements onto the user's view of the outside world.

The augmented reality device 20 further comprises one or more transceivers, modems, or other communication devices configured to enable communications with various other devices, at least including the IoT devices 40. Particularly, in the illustrated embodiment, the augmented reality device 20 comprises a Wi-Fi module 30 and an ultra-wide band (UWB) module 32. The Wi-Fi module 30 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. The UWB module 32 is configured to enable direct communication with the IoT devices 40 and includes at least one transceiver with a corresponding antenna, as well as any processors, memories, oscillators, or other hardware conventionally included in a UWB module.

As discussed in further detail below, the processor 24 is configured to operate the UWB module 32 to obtain the distance measurements 90 between the augmented reality device 20 and each of the IoT devices 40. The processor 24 is configured to operate the Wi-Fi module 30 to send and receive additional communications, such as control and data messages, to and from the IoT devices 40 via the Wi-Fi network and/or Wi-Fi router (e.g., using UDP and/or TCP, as well as WebRTC or the like). It will be appreciated, however, that other communication technologies, such as Bluetooth, Z-Wave, Zigbee, or any other radio frequency-based communication technology can be used to enable data communications between devices in the system 10, as well as enable distance measurement between devices in the system 10. In some embodiments, data communication and distance measurement can be implemented with a single wireless transceiver and/or communication technology.

In some embodiments, the augmented reality device 20 may further comprise an inertial measurement unit (IMU) 33 configured to measure one or more accelerations and/or rotational rates of the augmented reality device 20. In one embodiment, the IMU 33 comprises one or more accelerometers configured to measure linear accelerations of the augmented reality device 20 along one or more axes (e.g., roll, pitch, and yaw axes) and/or one or more gyroscopes configured to measure rotational rates of the augmented reality device 20 along one or more axes (e.g., roll, pitch, and yaw axes).

The augmented reality device 20 may also include a battery or other power source (not shown) configured to power the various components within the augmented reality device 20. In one embodiment, the battery of the augmented reality device 20 is a rechargeable battery configured to be charged when the augmented reality device 20 is connected to a battery charger configured for use with the augmented reality device 20.

In at least one embodiment, the program instructions stored on the memory 26 include a SLAM and IoT localization program 34. As discussed in further detail below, the processor 24 is configured to execute the SLAM and IoT localization program 34 to process a plurality of images frames captured of the scene 60 and/or inertial data received from the IMU 33 to perform visual and/or visual-inertial odometry to estimate the position, orientation, and trajectory of the camera 22 with respect to the scene 60 over the plurality of images frames. Based on the estimated position, orientation, and trajectory of the camera 22, the processor 24 is configured to generate a three-dimensional model or map representation of the scene 60, referred to herein as a SLAM map 36, which is stored in the memory 26. Finally, the processor 24 is configured obtain the plurality of distances measurements 90 and determine locations of the IoT devices 40 within the SLAM map 36 based on the plurality of distances measurements 90.

In at least one embodiment, the program instructions stored on the memory 26 further include an augmented reality program 38. As discussed in further detail below, the processor 24 is configured to execute the augmented reality program 38 to display on the display screen 28 real-time images/video captured by the camera 22 with graphical elements superimposed thereon for the purpose of discovering, monitoring, and operating IoT devices in the environment.

With continued reference to FIG. 2, in the illustrated exemplary embodiment, each IoT device 40 is provided with an IoT control board 42. The IoT control board 42 is configured to process distance measurements, deliver basic IoT functions, such as collecting sensor data and controlling appliances or actuators, and communicating with the augmented reality device 20. It will be appreciated, however, that a separate discrete IoT control board 42 is not necessary in all embodiments and the functions and features of the IoT control board 42 may be integrated with existing components of the IoT device 40 in many cases.

The IoT control board 42 of each IoT device 40 comprises a microcontroller 44. In at least one embodiment, the microcontroller 44 comprises at least one processor with associated memory (not shown) which stores as program instructions that, when executed by the processor, enable the IoT control board 42 and/or the IoT device 40 to perform various operations described elsewhere herein. The memory of the microcontroller 44 may be of any type of device capable of storing information accessible by the processor, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the microcontroller 44 may include a system with a central processing unit, graphics processing units, multiple processing units, dedicated circuitry for achieving functionality, programmable logic, or other processing systems. The microcontroller 44 is configured to communicate with other components of the IoT device 40 via one or more connections, data busses, or the like (e.g., using SPI and/or UART).

The IoT control board 42 of each IoT device 40 comprises one or more transceivers, modems, or other communication devices configured to enable communications various devices, at least including the augmented reality device 20 and the other IoT devices 40. Particularly, in the illustrated embodiment, the IoT control board 42 of each IoT device 40 comprises a Wi-Fi module 46 and an UWB module 48. The Wi-Fi module 46 is configured to enable communication with the Wi-Fi network and/or Wi-Fi router and includes at least one transceiver with a corresponding antenna, as well as any processors, memories, oscillators, or other hardware conventionally included in a Wi-Fi module. The UWB module 48 is configured to enable direct communication with the augmented reality device 20 and the other IoT devices 40 and includes at least one transceiver with a corresponding antenna, as well as any processors, memories, oscillators, or other hardware conventionally included in a UWB module. The memory of the microcontroller 44 stores firmware and/or program instructions that enable the microcontroller 44 to operate the UWB module 32 to obtain the distance measurements 90 between the augmented reality device 20 and each of the IoT devices 40. Additionally, the memory of the microcontroller 44 stores firmware and/or program instructions that enable the microcontroller 44 to operate the Wi-Fi module 30 to send and receive additional communications, such as control and data messages, to and from the augmented reality device 20 via the Wi-Fi network and/or Wi-Fi router (e.g., using UDP and/or TCP, as well as WebRTC or the like). However, it will be appreciated that other communication technologies, such as Bluetooth, Z-Wave, Zigbee, or any other radio frequency-based communication technology can be used to enable data communications between devices in the system 10, as well as enable distance measurement between devices in the system 10.

In at least some embodiments, the IoT control board 42 of each IoT device 40 comprises an IoT interface 50 for communicating with and/or operating one or more sensors 52 and/or actuators 54 of the IoT device 40. In at least one embodiment, the memory of the microcontroller 44 stores firmware and/or program instructions that enable the microcontroller 44 to receive sensor data from the one or more sensors 52 via the IoT interface 50 and, optionally, forward the sensor data to the augmented reality device 20 or any other external device via the Wi-Fi module 46. Moreover, in at least one embodiment, the memory of the microcontroller 44 stores firmware and/or program instructions that enable the microcontroller 44 to operate the one or more actuators 54 via the IoT interface. The microcontroller 44 may operate the one or more actuators 54 in response to command signals received from the augmented reality device 20 via the Wi-Fi module 46 or on the basis of some pre-determined automation rules. The memory of the microcontroller 44 may store firmware and/or program instructions that enable the microcontroller 44 to parse and interpret control messages received from the augmented reality device 20 and to operate the sensors 52 and/or actuators 54 based on the received control messages.

Each IoT control board 42 and/or the IoT device 40 may also include a battery or other power source (not shown) configured to power the various components within the IoT control board 42 and/or the IoT device 40. In one embodiment, the battery of the IoT control board 42 and/or the IoT device 40 is a rechargeable battery configured to be charged when the IoT control board 42 and/or the IoT device 40 is connected to a battery charger configured for use with the IoT control board 42 and/or the IoT device 40.

Method of Localizing IoT Devices within SLAM Map

Methods for operating the augmented reality system 10 are described below. In particular, methods are described for operating the AR device 20 and the IoT devices 40 to provide localization of the IoT devices 40 within the SLAM map 36 generated by the AR device 20. In the description of the methods, statements that a method is performing some task or function refers to a controller or processor executing programmed instructions (e.g., the SLAM and IoT localization program 34 and/or firmware of the microcontroller 44) stored in non-transitory computer readable storage media operatively connected to the controller or processor to manipulate data or to operate one or more components in the vehicle access system 10 to perform the task or function. Particularly, the processor 24 of the AR device 20 and/or the microcontroller 44 of the IoT device 40 may be such a controller or processor. Alternatively, the controller or processor may be implemented with more than one processor and associated circuitry and components, each of which is configured to form one or more tasks or functions described herein. Additionally, the steps of the methods may be performed in any feasible chronological order, regardless of the order shown in the figures or the order in which the steps are described.

Figure 3:
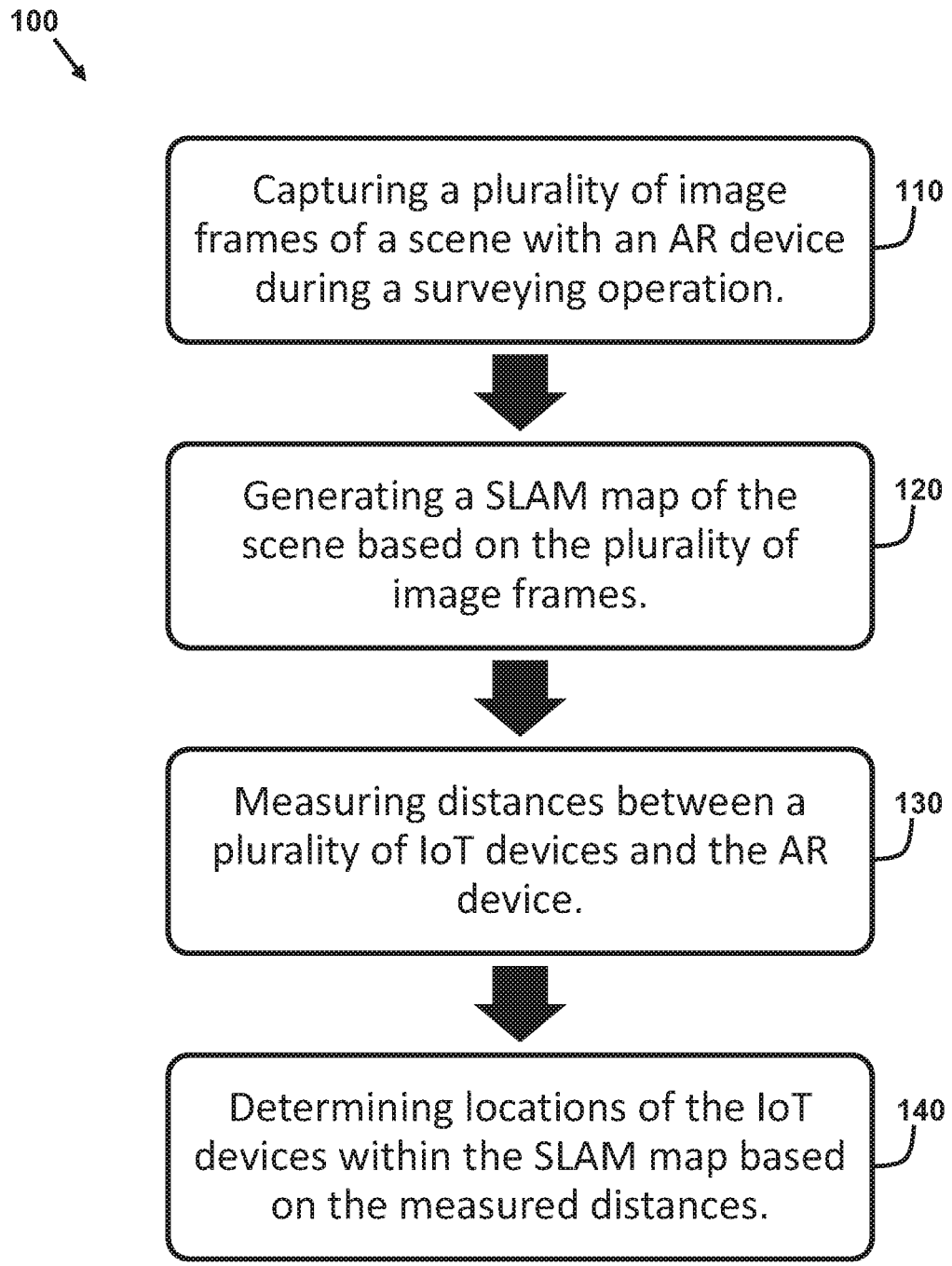
FIG. 3 shows a logical flow diagram for a method of localizing IoT devices within a SLAM map generated by an AR device.

FIG. 3 shows a method 100 for localizing IoT devices within a SLAM map generated by an AR device. In summary, the AR device 20 and the IoT devices 40 are considered to form a UWB network. Unlike some conventional localization methods in which all wireless nodes are stationary, the method 100 incorporates a dynamically moving wireless node (i.e., the AR device 20), along with a group of stationary wireless nodes (i.e., the IoT devices 40). The method 100 enables determination of the positions of the IoT devices 40 relative to the AR device 20. The AR device 20 uses SLAM to create and update a three-dimensional map (e.g., the SLAM map 36) of the surrounding environment (e.g., the scene 60) and is able to localize the IoT devices 40 within the global map. The method 100 leverages the mobility of the AR device 20 and collects distance measurements between AR device 20 and each of the stationary IoT devices 40 a multiple discrete measurement instances. The method 100 employs a multidimensional scaling (MDS) technique to derive 3D coordinates of the stationary IoT devices 40 within the SLAM map 36. The method advantageously treats the discrete measurement instances of the dynamically moving AR device 20 as equivalent to multiple stationary nodes having known locations within the SLAM map 36.

The method 100 begins with a step of capturing a plurality of image frames of a scene with a camera of an AR device during a surveying operation (block 110). Particularly, with respect to the embodiments described in detail herein, the processor 24 of the AR device 20 is configured to operate the camera 22 to capture a plurality of image frames of an environment (e.g., the scene 60) and to receive the plurality of image frames from the camera 22, as the AR device 20 is moved along a surveying path (e.g., the surveying path 80). As discussed above, each image frame comprises a two-dimensional array of pixels in which pixel has corresponding photometric information (e.g., one or more intensity, color, and/or brightness values). In some embodiments, the image frames are RGB-D image frames in which each pixel has both photometric information (e.g., one or more intensity, color, and/or brightness values) and geometric information (e.g., a depth or distance value). In other embodiments, the processor 24 is configured to extract and/or estimate geometric information based on the photometric information using a key feature detection technique. The plurality of image frames may be stored temporarily in a buffer memory of the memory 26. In some embodiments, certain image frames may be designated as keyframes and stored on a longer term basis in the memory 26.

The method 100 continues with a step of generating a SLAM map of the scene based on the plurality of image frames (block 120). Particularly, the processor 24 of the AR device 20 is configured to execute the SLAM and IoT localization program 34 to process the plurality of images frames captured of the scene 60 to perform visual odometry to estimate the position, orientation, and trajectory of the camera 22 with respect to the scene 60 over the plurality of images frames. In some embodiments, the processor 24 is configured to receive inertial data from the IMU 33 (i.e., acceleration data and rotation rate data) or other non-visual odometry information from additional sensors. Utilizing the inertial data or other non-visual odometry information in addition to the image frames, the processor 24 is configured to perform visual-inertial odometry, or some other kind of sensor-supplemented odometry, to estimate the position, orientation, and trajectory of the camera 22. Using the estimated position, orientation, and trajectory of the camera 22 with respect to the scene 60, the processor 24 is configured to execute the SLAM and IoT localization program 34 to generate a three-dimensional model or map representation of the scene 60, referred to herein as the SLAM map 36, based on the photometric information and/or geometric information corresponding to each image frame in the plurality of image frames.

It will be appreciated that problems of estimating the position, orientation, and trajectory of the camera 22 and of generating the three-dimensional model or map representation of the scene 60 are interdependent and, thus, in at least some embodiments, the processor 24 is configured to perform the processes simultaneously and iteratively as new image frames are received from the camera 22, using a SLAM algorithm. When each new image frame is received, the processor 24 is configured to associate the photometric information and/or geometric information of the new image frame with pre-existing information in the SLAM map 36 and update or refine the information in the SLAM map 36 based on the new information.

The SLAM map 36 generated by the AR device 20 may take several different forms. As used herein a "SLAM map" refers to any data structure defining a three-dimensional model, map, or other representation of a scene that has been captured by a camera. In some embodiments, the SLAM map 36 may comprise sparsely defined key features such as points, lines, or other geometric shapes representing the objects and structures of the scene. In some embodiments, the SLAM map 36 may comprise a dense point cloud representing the objects and structures of the scene. Each of the points, lines, or other geometric shapes of the SLAM map 36 may be associated with photometric information (e.g., one or more intensity, color, and/or brightness values).

In some embodiments, the SLAM map 36 has a three-dimensional reference frame characterized by three orthogonal coordinate axes (e.g., x, y, and z axes). The processor 24 is configured to receive data and/or signals regarding linear accelerations of the respective augmented reality device 20 along one or more axes and/or data and/or signals regarding rotational rates of the respective augmented reality device 20 along one or more axes from the IMU 33. In at least one embodiment, the processor 24 are configured to generate the SLAM map 36 such that a first coordinate axis (e.g., the y-axis) is gravity aligned based on the data and/or signals regarding linear accelerations received from the IMU 33. Consequently, second and third coordinate axes (e.g., the x-axis and z-axis) of the SLAM map 36 form a horizontal plane with respect to the earth.

The method 100 continues with a step of measuring distances between a plurality of IoT devices and the AR device (block 130). Particularly, the method 100 utilizes two groups of distances measurements. The method 100 utilizes a plurality of constant distances that are measured between each of the n stationary nodes (i.e., the IoT devices 40). Additionally, the method 100 utilizes a plurality of dynamic distance measurements between the dynamic node (i.e., the AR device 20) and each of the n stationary nodes (i.e., the IoT devices 40). The plurality of dynamic distance measurements includes m subsets of dynamic distance measurements. Each of the m subsets of dynamic distance measurements are measured from a distinct measurement location of the dynamic node (i.e., the AR device 20). Due to the self-localizing quality of the dynamic node (i.e., the AR device 20), each of the m subsets of dynamic distance measurements can be considered to be distances measurements with respect to a mobile anchor having a known location within the SLAM map 36.

The microcontroller 44 of each of the IoT devices 40 is configured to execute program instructions of its firmware to operate the respective UWB module 44 to exchange messages with the UWB modules 44 of each of the other IoT devices 40 in system 10 in order to measure the constant distances between each combination of the IoT devices 40. In at least one embodiment, the microcontrollers 44 of each of the IoT devices 40 are configured to employ an asymmetrical double-sided two-way ranging scheme for time-of-flight measurements between the IoT devices 40, from which the distance measurements can be derived. In embodiments in which each microcontroller 44 runs asynchronously, this scheme advantageously corrects clock drift by exchanging two round-trip messages. In at least one embodiment, the constant distances between each combination of the IoT devices 40 are measured alternatingly.

The microcontrollers 44 of the IoT devices 40 are configured to operate the respective Wi-Fi modules 46 to transmit data messages including the measured constant distances to the AR device 20. The processor 24 of the AR device 20 is configured to operate the Wi-Fi module 30 to receive the measured constant distances from the IoT devices 40. It will be appreciated that, assuming a fully connected network with n IoT devices 40, the total number of measured constant distances is $n(n-1)/2$ distance measurements across the IoT devices alternatively. The processor 24 is configured to store the measured constant distances received from the IoT devices 40 in the memory 26.

Next, as the AR device 20 is moved along a path through the scene 60, such as during the surveying process of step 110, the processor 24 is configured to execute instructions of the SLAM and IoT localization program 34 to operate the UWB module 32 to exchange messages with the UWB modules 44 of each of the IoT devices 40 in system 10 in order to measure sets of dynamic distances between the AR device 20 and each of the IoT devices 40 at m distinct measurement locations along the path (where m≥4). In at least one embodiment, the microcontrollers 44 of each of the IoT devices 40 are configured to employ an asymmetrical double-sided two-way ranging scheme for time-of-flight measurements between the IoT devices 40, from which the distance measurements can be derived. The processor 24 is configured to store the measured sets of dynamic distances in the memory 26.

Additionally, at each of the m distinct measurement locations along the path, the processor 24 is configured to determine the location of the AR device 20 in the reference frame of the SLAM map 36 based on corresponding images captured of the scene 60 from the respective measurement locations. As will be discussed in greater detail below, the m distinct measurement locations need to be non-coplanar. If the determined location is valid (i.e., not coplanar with previously recorded measurement locations), the processor 24 is configured to store the location of the AR device in association with the corresponding set of dynamic distance measurements measured from the particular measurement location.

The m distinct measurement locations of the AR device 20 can be considered stationary anchor nodes having known locations in the SLAM map 36 and the n IoT devices 40 can be considered stationary nodes having unknown positions in the SLAM map 36. Thus, once the constant and dynamic distance measurements are obtained, assuming a fully connected network, a Euclidean distance matrix D across N nodes can be completed, where N=n+m. The elements of the Euclidean distance D matrix are denoted $\hat{d}_{ij}$, where $i \in \{1, \ldots, N\}$ and $j \in \{1, \ldots, N\}$.

In the detailed embodiments described herein, the UWB modules 32, 48 are utilized for distance measurements between the devices 20, 40 of the system 10. However, it will be appreciated that any type of wireless transceiver can be used to perform the distance measurements if it enables sufficient accuracy for the intended use.

The method 100 continues with a step of determining locations of the IoT devices within the SLAM map based on the measured distances (block 140). Particularly, the processor 24 is configured to execute instructions of the SLAM and IoT localization program 34 to determining the locations of the n IoT devices 40 based on the m distinct measurement locations of the AR device 20 and the Euclidean distance matrix D, which includes the constant distance measurements between the IoT device 40 and the set of the dynamic distance measurements between AR device 20 and the IoT device 40 at each of the m distinct measurement locations of the AR device 20.

The processor 24 is configured to use a multidimensional scaling (MDS) technique to calculate the unknown locations of the n IoT devices 40 in the reference frame of the SLAM map 36. MDS is a technique which recovers the coordinates of a collection of nodes by minimizing the mismatch and/or differences between the measured distances and the distances calculated from the estimated coordinates.

We denote the coordinates of the N nodes as a location matrix $X = [x_1, \ldots, x_N]^T \in \mathbb{R}^{N \times 3}$. Using the MDS algorithm, the processor 24 estimates the relative coordinates of the nodes by minimizing the stress function S(X):

$$\min_X S(X) = \min_X \sum_{i \leq j \leq N} \omega_{ij}(\hat{d}_{ij} - d_{ij}(X))^2, \qquad (1)$$

where $\hat{d}_{ij}$ is the distance measurement from the Euclidean distance matrix D, $d_{ij} = \|x_i - x_j\|$, and $\omega_{ij}$ is a weight value defined based on the quality of the distance measurements. We denote a weight matrix W with the size of N×N which includes elements $\omega_{ij}$, where $i \in \{1, \ldots, N\}$ and $j \in \{1, \ldots, N\}$.

To solve this optimizing problem, the processor 24 is configured to utilize, in a modified form, an iterative technique called "Scaling by MAjorizing a COmplicated function" (SMACOF). We introduce a majorizing function as $T(X,Z) \geq S(X)$ which bounds S from the above and touches the surface of S at $Z \in \mathbb{R}^{N \times 3}$:

$$S(X) \leq T(X,Z) = C + tr(X^T V X) - 2tr(X^T B(Z) Z) \qquad (2),$$

where the matrix elements of V and B(Z) are defined as follows:

$$v_{ij} = \begin{cases} \sum_{k=1, k \neq j} -\omega_{kj} & \text{if } i \neq j, \\ \sum_{k=1, k \neq j} v_{kj} & \text{if } i = j, \end{cases}$$

$$b_{ij} = \begin{cases} \sum_{k=1, k \neq j} \omega_{kj} \frac{\hat{d}_{ij}}{d_{ij}(Z)} & \text{if } i \neq j, \\ \sum_{k=1, k \neq j} b_{kj} & \text{if } i = j, \end{cases}$$

and where T(X,Z) is a quadratic and thus a convex function.

Figure 4:
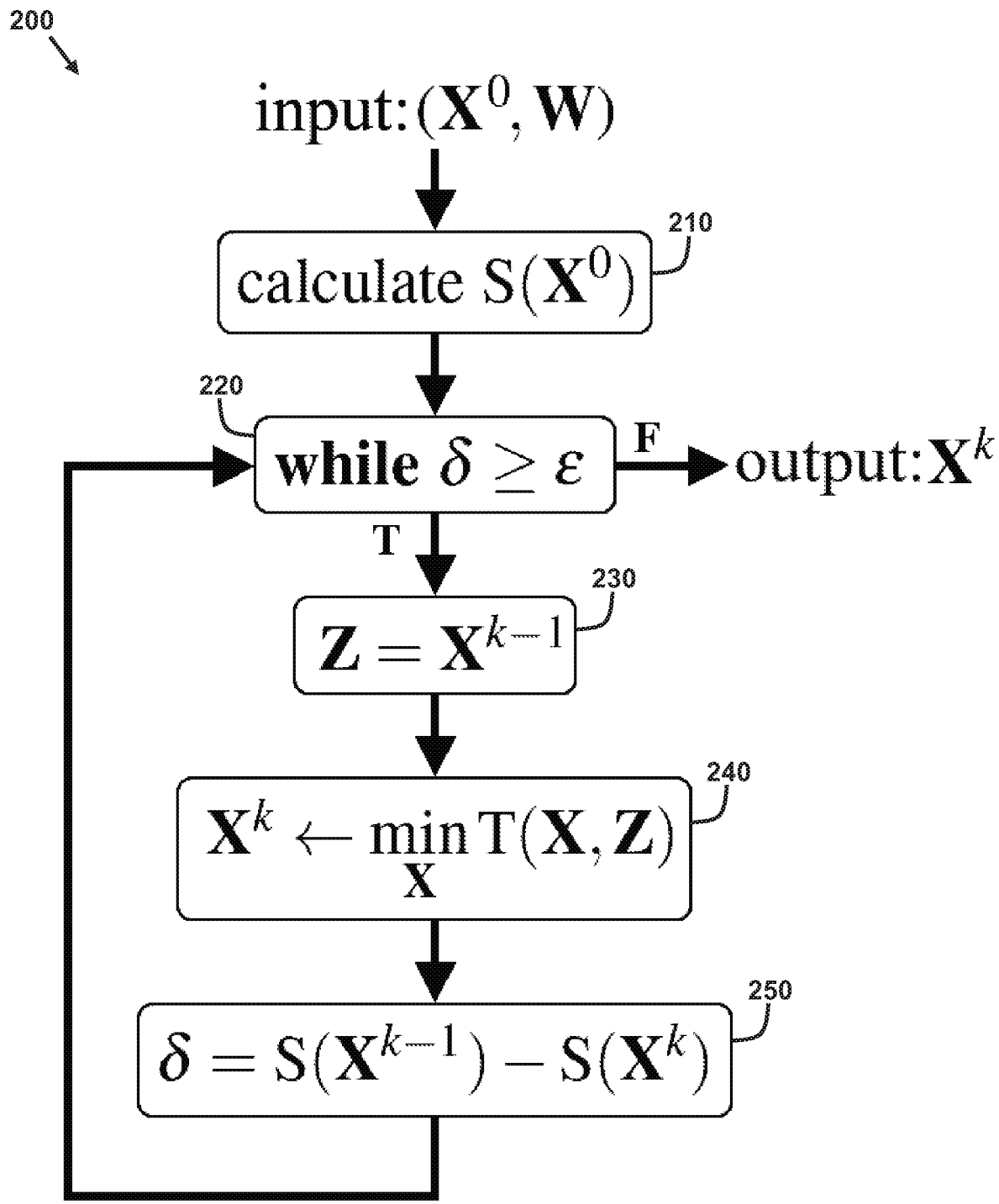
FIG. 4 shows a logical flow diagram for an algorithm for minimizing the stress function for the purpose of localizing the IoT devices.

FIG. 4 shows a logical flow diagram that summarizes the iterative SMACOF algorithm 200 for minimizing the stress function S(X). The processor 24 receives as inputs an initialized location matrix $X^0$ and weight matrix W. Next, the processor 24 calculates an initial value of the stress function $S(X^0)$ using the initialized location matrix $X^0$ (block 210). Next, the processor 24 iteratively minimizes the majorizing function T(X,Z), while a convergence value δ is greater than or equal to a predetermined convergence threshold ε (e.g., ε=1e−12), until a predetermined maximum iteration limit is reached (e.g., 500 iterations), or until some other convergence criterion is satisfied (block 220). First, in each iteration, the processor 24 sets the matrix Z equal to $X^{k-1}$, $X^{k-1}$ value of the location matrix X for the previous iteration k−1 (block 230). Next, in each iteration, the processor 24 determines a new value of the location matrix $X^k$ by minimizing the majorizing function T(X,Z) (block 240). The minimization of the majorizing function T(X,Z) is discussed in detail below. Finally, in each iteration, the processor 24 determines the convergence value δ as a difference between a value of the stress function for the previous iteration $S(X^{k-1})$ and a value stress function for the current iteration $S(X^k)$ (block 250). The processor 24 compares the convergence value δ with the predetermined convergence threshold ε and outputs the most recent value of the location matrix $X^k$ in response to the convergence value δ being less than the predetermined convergence threshold ε.

In a conventional SMACOF process, the minimum of the majorizing function T(X,Z) can be computed as:

$$X = \min_x T(X, Z) = V^{-1} B(Z) Z. \quad (3)$$

However, the absolute positions of the nodes are lost when we rely only on the distance information. In order to recover the absolute positions fully, the process 200 is modified to utilized the known positions of the m distinct measurement locations of the AR device 20. One way of estimating the absolute positions is performing a full SMACOF in N dimension followed by a Procrustes Analysis using the m distinct measurement locations as anchors. However, this has two drawbacks: (a) the distances across m anchors should not contribute to the stress function; (b) the search space in SMACOF increases from a dimension of $\mathbb{R}^{N \times 3}$ to $\mathbb{R}^{N \times 3}$ unnecessarily.

In order to address these drawbacks, the processor 24 is configured to partition the location matrix X. Particularly, the processor 24 is configured to partition the location matrix X and the matrix Z as into "unknown" partitions $K_u$ and $Z_u$ and "anchor" partitions $X_a$ and $Z_a$ as follows:

$$X = \begin{bmatrix} X_a \\ X_u \end{bmatrix}, X = \begin{bmatrix} Z_a \\ Z_u \end{bmatrix},$$

where, $X_a = [x_1, \ldots, x_n]^T \in \mathbb{R}^{n \times 3}$, $X_u = [x_{n+1}, \ldots, x_{n+m}]^T \in \mathbb{R}^{m \times 3}$, $Z_a = [Z_1, \ldots, Z_n]^T \in \mathbb{R}^{n \times 3}$, $Z_u = [Z_{n+1}, \ldots, Z_{n+m}]^T \in \mathbb{R}^{m \times 3}$, Similarly, the processor 24 is configured to partition the weight matrix W, as follows:

$$W = \begin{bmatrix} W_{11} & W_{12} \\ W_{21} & W_{22} \end{bmatrix},$$

where block matrix $W_{11}$ is of size n×n, block matrices $W_{12} = W_{21}^T$ are of size n×m, and block matrix $W_{22}$ is of size m×m. The block matrix $W_{11}$ refers to weights of the constant distance measurements across $X_u$ (i.e., between the IoT devices 40) which are only measured once. The block matrices $W_{12} = W_{21}^T$ refers to weights of the distance measurement between $X_u$ and $X_a$ (i.e., between the AR device 20 and the IoT devices 40).

In at least one embodiment, the processor 24 is configured to set the elements in the block matrix $W_{11}$ equal to a first number (e.g., 1) and set the set the elements in the block matrices $W_{12} = W_{21}^T$ equal to a second number (e.g., 5) that is larger compared to those of the block matrix $W_{11}$. In at least one embodiment, the processor 24 is configured to simplify S(X) by setting the elements in the block matrix $W_{22}$ equal to 0, because distances among the anchors contribute nothing to the stress function (Equation (1)). In some embodiments, the processor 24 is configured to set the values of the elements in the weight matrix W automatically depending on some metric that is indicative of the quality of each particular distance measurement.

The processor 24 is configured to determine the auxiliary matrices V and B(Z) using the selected values of the weight matrix W. In the same way as the weight matrix W, the processor 24 is configured to partition the auxiliary matrices V and B into block matrices as follows:

$$V = \begin{bmatrix} V_{11} & V_{12} \\ V_{21} & V_{22} \end{bmatrix},$$

$$B = \begin{bmatrix} B_{11} & B_{12} \\ B_{21} & B_{22} \end{bmatrix},$$

where block matrices $V_{11}$ and $B_{11}$ are of size n×n, block matrices $V_{12} = V_{21}^T$ and $B_{12} = B_{21}^T$ are of size n×m, and the block matrices $V_{22}$ and $B_{22}$ are of size m×m.

The equation (3) can be simplified to only account for the nodes having unknown locations using the partitioned matrices described above. Particularly, the processor 24 is configured to only determine the locations of the nodes with unknown positions (i.e., the IoT devices 40) at the step 240 of the iterative SMACOF algorithm using the simplified equation:

$$X_u = \min_x T(X, Z) = V_{22}^{-1}(B_{22} Z_u + B_{22}^T Z_a - V_{12}^T X_a). \quad (4)$$

These modifications to the SMACOF algorithm advantageously reduce computation complexity by splitting the matrices and reducing the dimensions. This is advantageous because the AR device 20 is general a mobile computing device having relatively limited processing power. Additionally, the modifications to the SMACOF algorithm are such that the number of the mobile anchor points m can be arbitrarily large (e.g., 100) to improve accuracy, without negatively affecting performance.

Finally, after determining the locations $X_u$ of the IoT devices 40 in the reference frame of the SLAM map 36, the processor 24 is configured to store the locations $X_u$ of the IoT devices 40 in the memory 26 for usage by the AR device 20.

Exemplary Use Cases

The method 100 for localizing the IoT device 40 within the SLAM map 36 advantageously enables a variety of useful features and interactions with respect to AR applications. Particularly, the method 100 enables the AR device 20 to survey an unknown environment and automatically discover and localize IoT device 40 that are in or nearby the surveyed environment. In at least one embodiment, in response to connecting to a particular Wi-Fi network, the processor 24 of the AR device 20 is configured to transmit messages on the Wi-Fi network to solicit the identities of IoT devices 40 that are on the particular Wi-Fi network. The IoT devices 40 that are on the particular Wi-Fi network respond to the messages with the necessary information to pair with the AR device 20. Once paired, the AR device 20 performs the process 100 described above to generate a map of the environment and to localize the IoT devices 40 on the particular Wi-Fi network within the reference frame of the generated map.

In at least some embodiments, the processor 24 of the AR device 20 is configured to execute instructions of the AR application 38 to render an AR graphical user interface and display it on the display screen 28. The AR graphical user interface can include one or more graphical elements. In the case of a handheld AR device, one or more graphical elements of the AR graphical user interface may be superimposed on real-time video and/or image frames captured by the camera 22. However, in the case of a head mounted display, one or more graphical elements of the AR graphical user interface are rendered on the transparent display screen such that they are superimposed on a view of the user's surroundings through the head mounted display. The graphical elements are advantageously rendered depending on the known location of corresponding IoT devices 40 (illustrated in more detail below). By exploiting the spatial relationship between the user and the connected IoT devices 40, e.g., distance, orientation, and movement, AR device 20 can provide context aware in situ AR interactions with the IoT devices 40.

In at least some embodiments, the processor 24 of the AR device 20 is configured to operate the Wi-Fi module 30 to receive at least one status parameter from one or more of the IoT devices 40. As used herein, the phrase "status parameter" refers to any parameter relating to the status, control state, operating state, or other state of device. Exemplary status parameters may include a status of an IoT device 40 (e.g., "on," "off," "low battery," "filter needs replaced," etc.), sensor data measured by the respective sensor(s) 52 of an IoT device 40 (e.g., temperature, moisture, motion, occupancy, etc.), or a control status of the respective actuator(s) 54 ("cooling," "heating," "fan speed: high," etc.). The processor 24 is configured to render the graphical elements associated with the IoT device 40 from which the status parameters are received depending on the status parameter and, in particular, render the graphical elements to indicate the status parameter to the user. For example, an icon associated with a particular IoT device might be rendered green to indicate the status parameter "on" and rendered red to indicate the status parameter "off." Similarly, an icon associated with a particular IoT device might be rendered to include text, a meter, a number, or the like that indicates a value of a status parameter, as illustrated in FIG. 5 and FIG. 6, which are described below.

In some embodiments, the AR device 20 enables distance and/or orientation dependent interfaces with the IoT devices 40. Particularly, as discussed above, using a SLAM technique, the processor 24 is configured to perform odometry to continuously estimate the position, orientation, and trajectory of the camera 22 within the environment, based on images of the environment captured by the camera 22, as well as inertial data received from the IMU 33. Based on the estimated position, orientation, and trajectory, the processor 24 is configured to determine a distance of the AR device 20 to a particular IoT device 40 and/or an orientation of the AR device 20 with respect to a particular IoT device 40. In some embodiments, the processor 24 is configured to render the graphical elements associated with the particular IoT device 40 depending on the determined distance and/or orientation of the AR device 20 with respect to the particular IoT device 40. For example, as described below with respect to FIG. 5, based on the orientation of the AR device 20, the graphical elements can be rendered at particular position within AR graphical user interface depending on the position of the IoT device 40 within the view frustum and/or depending on whether the IoT device 40 is located within the view frustum at all. Similarly, as described below with respect to FIG. 6, based on the distance of the AR device 20, the graphical elements can be rendered with greater levels of detail and/or information as the user moves closer to the IoT device 40.

Figure 5:
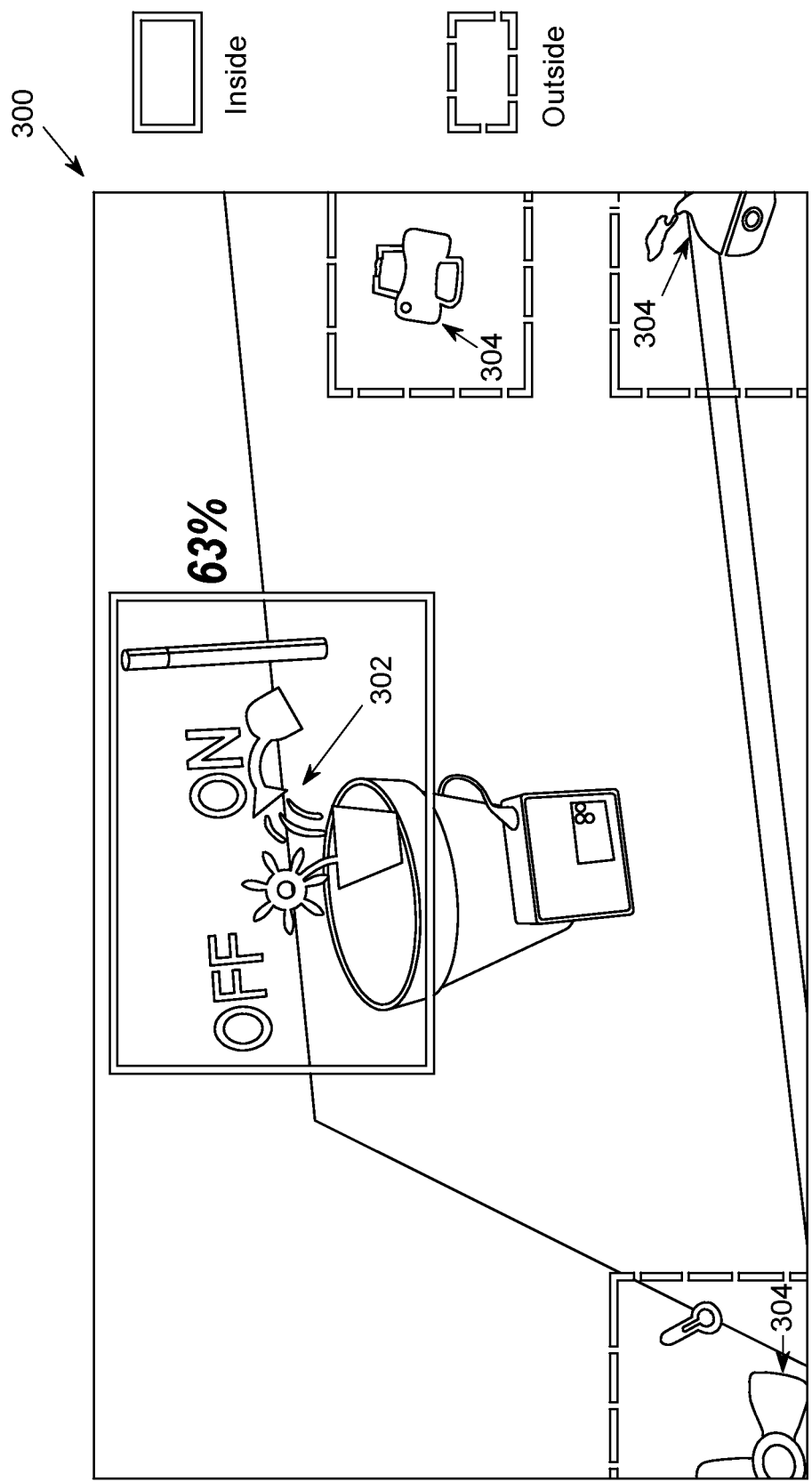
FIG. 5 shows a graphical user interface illustrating a first exemplary use case for the method of FIG. 3.

FIG. 5 shows an AR graphical interface 300 illustrating a first exemplary use case of the method 100. As discussed above, when a user enters a new environment, the AR device 20 broadcasts a discovery message to the network then all connected IoT devices 40 send an acknowledgement and register with their identities. After the user localizes the IoT devices, graphical elements corresponding to the IoT devices 40 are be relocated to the discovered 3D positions. Users can simply browse the digitally enhanced world within the augmented scene. As shown, the AR graphical interface 300 includes a graphical element 302 superimposed at the location of an IoT device (illustrated as a plant watering system) inside the view of the camera 22. Additionally, the AR graphical interface 300 also enables the user to visualize the IoT devices 40 that are not located inside the view of the camera 22. Particularly, as shown, the AR graphical interface 300 includes a graphical element 304 superimposed at the edge of the AR graphical interface 300 indicating a direction of IoT devices 40 that are not currently inside the view of the camera 22. To achieve this effect, the processor 24 is configured to parameterize the outside view space using spherical coordinates and shift the outside locations to the peripheral region of the view frustum. In this way, the spatial information regarding the IoT devices 40 that are not currently inside the view of the camera is preserved.

Figure 6:
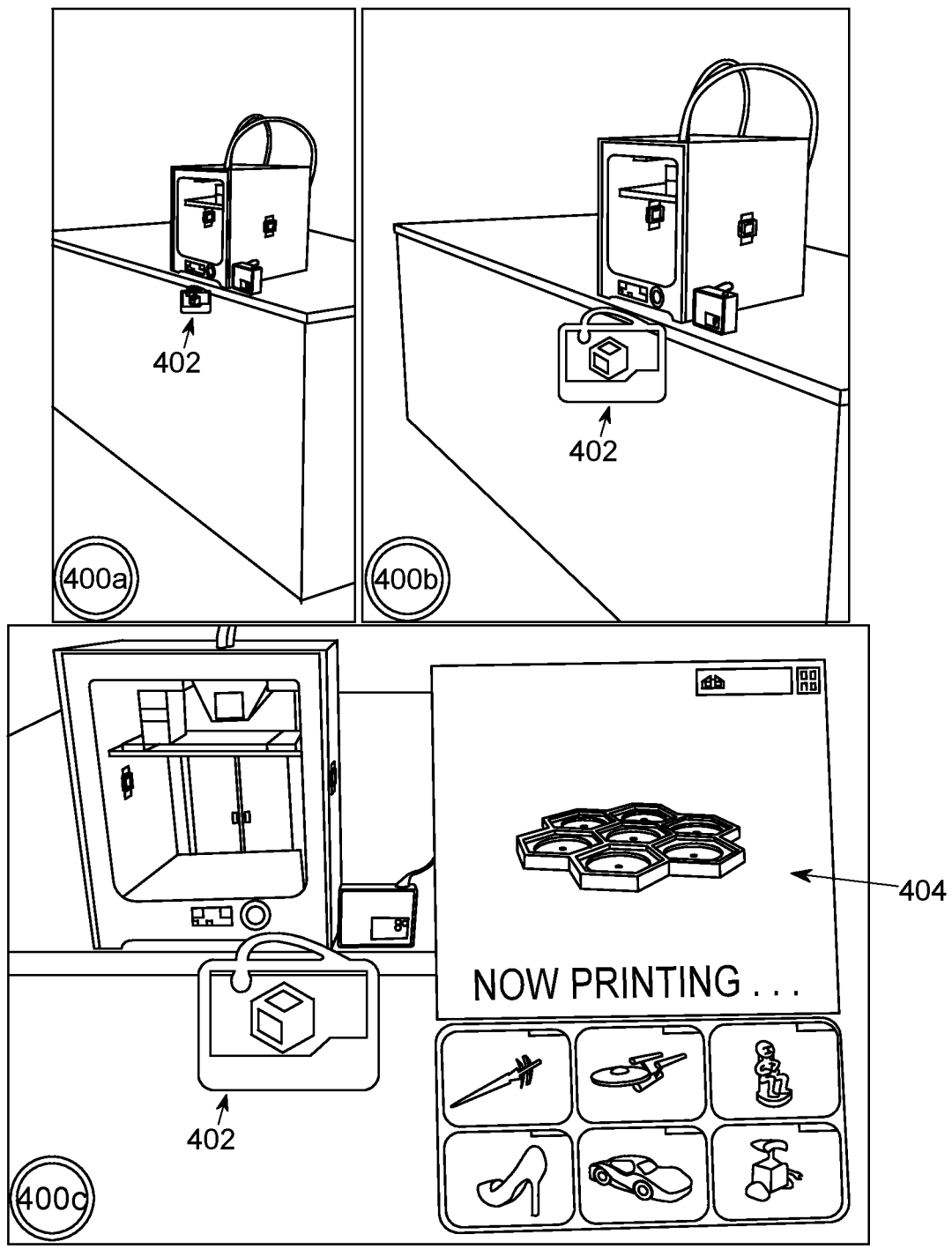
FIG. 6 shows graphical user interfaces illustrating a second exemplary use case for the method of FIG. 3.
Figure 7:
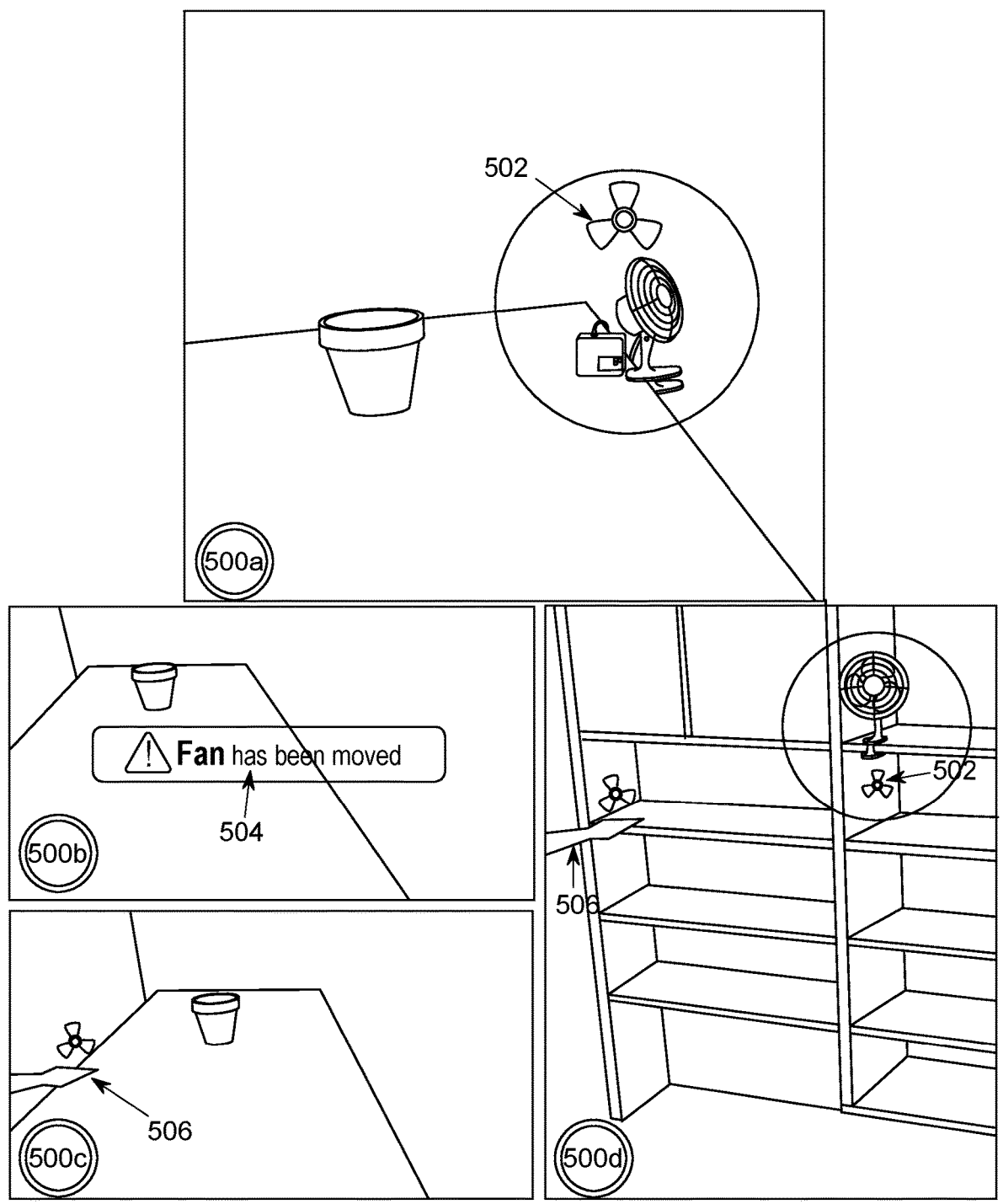
FIG. 7 shows graphical user interfaces illustrating a third exemplary use case for the method of FIG. 3.

FIG. 6 shows AR graphical interfaces 400a-c illustrating a second exemplary use case of the method 100. The AR graphical interfaces 400a-c include graphical elements 402, which are essentially similar to the graphical elements 302 of FIG. 5, and indicate locations of the IoT devices. However, as shown in the AR graphical interfaces 400c, as the user approaches the IoT device (shown as a 3D printer), additional interactive graphical elements 404 are displayed to enable the user to examine the status of the IoT device or operate the IoT device through the AR graphical interface. In this way, as users move closer or farther from to an IoT device, the AR graphical interfaces adjust to provide different levels of engagement depending on the distance from the IoT device FIG. 7 shows AR graphical interfaces 500a-d illustrating a third exemplary use case of the method 100. As discussed above, the locations of IoT devices are stored in the memory 26. In one embodiment, when the user re-enters a scene that has been previously mapped, the AR device is configured to check the distance measurements across the IoT devices and/or between the IoT device and the AR device. If they do not match with the calculations based on the last location records, it can be determined that the IoT devices have been moved from their original locations. The AR graphical interface 500a shows an IoT device in an initial location and includes a graphical element 502, which is essentially similar to the graphical elements 302 of FIG. 5, and indicates a location of the IoT device. If it is later determined that the IoT device has been moved, the AR device 20 displays a corresponding message 504 (e.g., "Fan has been moved!"), as shown in the AR graphical interface 500b. Once a new location is determined for the IoT device, the AR device 20 displays an arrow 506 pointing in the direction of the IoT device at its new location and the graphical element 502 is relocated to the new location of the IoT device, as shown in the AR graphical interfaces 500c-d.

Figure 8:
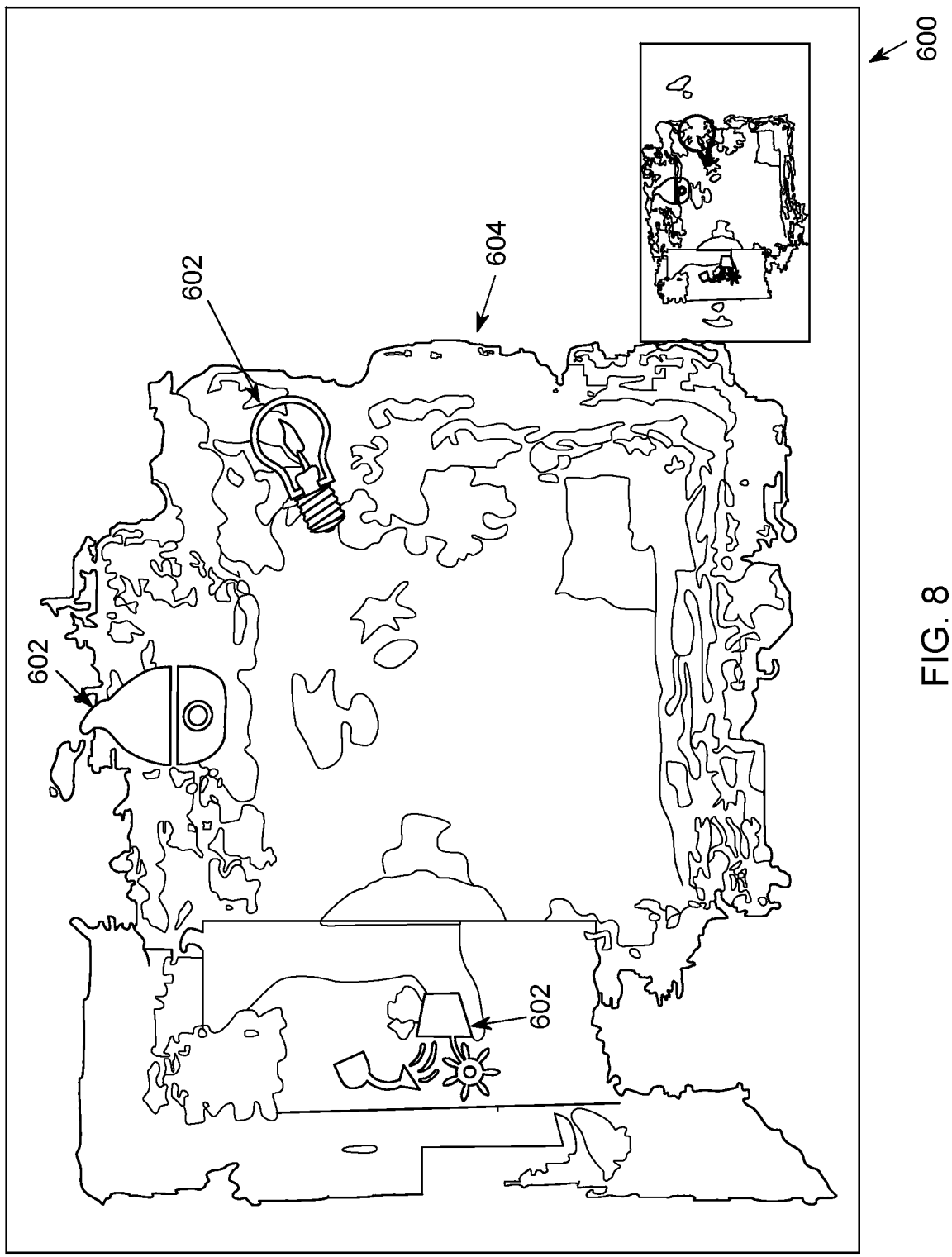
FIG. 8 shows a graphical user interface illustrating a fourth exemplary use case for the method of FIG. 3.

FIG. 8 shows an AR graphical interface 600 illustrating a fourth exemplary use case of the method 100. The AR graphical interface 600 includes a visual representation 604 (e.g., a mesh model) of the SLAM map corresponding to an environment that has been surveyed by the AR device 20. The AR graphical interface 600 includes graphical elements 602, which are essentially similar to the graphical elements 302 of FIG. 5, and indicate locations of the IoT devices within the visual representation 604 of the SLAM map. The users can further interact with the AR graphical interface 600 to control the monitor and/or control IoT devices.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for localizing a plurality of stationary devices in an environment with a mobile device, the method comprising:
    capturing a first plurality of images of the environment with a camera of the mobile device, the first plurality of images being captured as the mobile device is moved throughout the environment;
    generating, with a processor of the mobile device, a three-dimensional map of the environment based on the first plurality of images of the environment;
    measuring a first plurality of distance measurements between the mobile device and each individual stationary device in the plurality of stationary devices, the first plurality of distance measurements being measured by operating a first wireless transceiver of the mobile device to exchange messages with respective second wireless transceivers of each of the plurality of stationary devices, the first plurality of distance measurements being measured while the mobile device is moved along a path through the environment, the path comprising at least four distinct measurement locations from which at least four respective subsets of the distance measurements in the first plurality of distance measurements are measured;
    determining, with the processor, the at least four distinct measurement locations in a reference frame of the three-dimensional map of the environment based on images of the environment captured by the camera at the at least four distinct measurement locations;
    receiving, from the plurality of stationary devices, a second plurality of distance measurements between each stationary device in the plurality of stationary devices and each other stationary device in the plurality of stationary devices, the second plurality of distance measurements being measured by operating the second wireless transceiver of each stationary device in the plurality of stationary devices to exchange messages with the second wireless transceivers of each other stationary device in the plurality of stationary devices; and
    determining, with the processor, locations of the plurality of stationary devices in the reference frame of the three-dimensional map of the environment based on the first plurality of distance measurements, the second plurality of distance measurements, and the at least four distinct measurement locations in the reference frame of the three-dimensional map.

2. The method according to claim 1, the determining the locations of the plurality of stationary devices further comprising:
    estimating the locations of the plurality of stationary devices by minimizing differences between (i) the first plurality of distance measurements and the second plurality of distance measurements and (ii) corresponding distances calculated from the estimated locations of the plurality of stationary devices.

3. The method according to claim 2, the minimizing differences further comprising:
    calculating a weighted sum of differences between (i) the first plurality of distance measurements and the second plurality of distance measurements and (ii) corresponding distances calculated from the estimated locations of the plurality of stationary devices.

4. The method according to claim 3, wherein differences between (i) the first plurality of distance measurements and (ii) corresponding distances calculated from the estimated locations of the plurality of stationary devices are weighted more heavily in the weighted sum than differences between (i) the second plurality of distance measurements and (ii) corresponding distances calculated from the estimated locations of the plurality of stationary devices.

5. The method according to claim 2, the minimizing differences further comprising:
    iteratively calculating values for the locations of the plurality of stationary devices using a majorizing function until the calculated values of the locations of the plurality of stationary devices satisfy a convergence criterion.

6. The method according to claim 5, the iteratively calculating values for the locations of the plurality of stationary devices further comprising:
    calculating the majorizing function based on the first plurality of distance measurements, the second plurality of distance measurements, and the locations of each of the at least four distinct measurement locations.

7. The method according to claim 1, wherein the first wireless transceiver of the mobile device is an ultra-wideband transceiver and the second wireless transceivers of each of the plurality of stationary devices are ultra-wideband transceivers.

8. The method according to claim 1, wherein at least one of the stationary devices has an actuator and is configured to receive control messages from the mobile device and operate the actuator based on the control message.

9. The method according to claim 1, the receiving of the second plurality of distance measurements further comprising:
    receiving the second plurality of distance measurements from the plurality of stationary devices with a third transceiver of the mobile device, which is different from the first transceiver of the mobile device.

10. The method according to claim 9, wherein the third transceiver is a Wi-Fi transceiver.

11. The method according to claim 1, the measuring the first plurality of distance measurements further comprising:
    measuring times of flight of messages transmitted between the mobile device and individual stationary devices in the plurality of stationary devices.

12. The method according to claim 1 further comprising:
    displaying, on a display screen of the mobile device, a graphical user interface having graphical elements that are rendered depending on the locations of the plurality of stationary devices.

13. The method according to claim 12, the displaying further comprising:
    capturing, with the camera, a second plurality of images of the environment; and
    displaying the graphical user interface having the second plurality of images of the environment displayed in real-time with the graphical elements superimposed on the second plurality of images.

14. The method according to claim 12 further comprising:
receiving a status parameter from at least one stationary device in the plurality of stationary devices,
wherein the graphical elements include at least one graphical element associated with the at least one stationary device and which is rendered depending on the status parameter.

15. The method according to claim 12 further comprising:
determining, with the processor, at least one of (i) a distance of the mobile device from at least one stationary device in the plurality of stationary devices and (ii) an orientation of the mobile device with respect to at least one stationary device in the plurality of stationary devices, based on images of the environment captured by the camera at the at least four distinct measurement locations,
wherein the graphical elements include at least one graphical element associated with the at least one stationary device and which is rendered depending on the at least one of (i) the distance of the mobile device from the at least one stationary device and (ii) an orientation of the mobile device with respect to the at least one stationary device.

16. A mobile device for localizing a plurality of stationary devices in an environment, the mobile device comprising:
a camera configured to capture images of the environment;
a first wireless transceiver configured to measure distances between the mobile device and individual stationary devices in the plurality of stationary devices by exchanging messages with respective second wireless transceivers of each of the plurality of stationary devices; and
a processor operably connected to the camera and to the first wireless transceiver, the processor being configured to:
operate the camera to capture a first plurality of images of the environment, the first plurality of images being captured as the mobile device is moved throughout the environment;
generate a three-dimensional map of the environment based on the first plurality of images of the environment;
operate the first transceiver to measure a first plurality of distance measurements between the mobile device and each individual stationary device in the plurality of stationary devices, the first plurality of distance measurements being measured while the mobile device is moved along a path through the environment, the path comprising at least four distinct measurement locations from which at least four respective subsets of the distance measurements in the first plurality of distance measurements are measured;
determine the at least four distinct measurement locations in a reference frame of the three-dimensional map of the environment based on images of the environment captured by the camera at the at least four distinct measurement locations;
receive, from the plurality of stationary devices, a second plurality of distance measurements between each stationary device in the plurality of stationary devices and each other stationary device in the plurality of stationary devices, the second plurality of distance measurements being measured by operating the second wireless transceiver of each stationary device in the plurality of stationary devices to exchange messages with the second wireless transceivers of each other stationary device in the plurality of stationary devices; and
determine locations of the plurality of stationary devices in the reference frame of the three-dimensional map of the environment based on the first plurality of distance measurements, the second plurality of distance measurements, and the at least four distinct measurement locations in the reference frame of the three-dimensional map.

17. The mobile device according to claim 16, the processor being further configured to:
determine the locations of the plurality of stationary devices by estimating the locations of the plurality of stationary devices by minimizing differences between (i) the first plurality of distance measurements and the second plurality of distance measurements and (ii) corresponding distances calculated from the estimated locations of the plurality of stationary devices.

18. The mobile device according to claim 17, the processor being further configured to:
calculate a weighted sum of differences between (i) the first plurality of distance measurements and the second plurality of distance measurements and (ii) corresponding distances calculated from the estimated locations of the plurality of stationary devices.

19. The mobile device according to claim 18, wherein differences between (i) the first plurality of distance measurements and (ii) corresponding distances calculated from the estimated locations of the plurality of stationary devices are weighted more heavily in the weighted sum than differences between (i) the second plurality of distance measurements and (ii) corresponding distances calculated from the estimated locations of the plurality of stationary devices.

20. The mobile device according to claim 17, the processor being further configured to:
minimize the differences by iteratively calculating values for the locations of the plurality of stationary devices using a majorizing function until the calculated values of the locations of the plurality of stationary devices satisfy a convergence criterion, the majorizing function being calculated based on the first plurality of distance measurements, the second plurality of distance measurements, and the locations of each of the at least four distinct measurement locations.

* * * * *